(12) United States Patent
Bartonek (10) Patent No.: US 9,168,937 B2
(45) Date of Patent: Oct. 27, 2015

(54) MULTI-FUNCTION DRAGGER

(71) Applicant: PROGRESS RAIL SERVICES CORPORATION, Albertville, AL (US)

(72) Inventor: Mark Joseph Bartonek, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 7 days.

(21) Appl. No.: 13/659,262

(22) Filed: Oct. 24, 2012

(65) Prior Publication Data

US 2014/0110537 A1 Apr. 24, 2014

(51) Int. Cl.

| B61L 3/00 | (2006.01) |
|---|---|
| B61L 3/02 | (2006.01) |
| B61L 23/00 | (2006.01) |
| G06F 11/30 | (2006.01) |
| B61L 27/00 | (2006.01) |
| B61L 1/20 | (2006.01) |
| G06F 11/07 | (2006.01) |

(52) U.S. Cl.
CPC ............... *B61L 27/0094* (2013.01); *B61L 1/20* (2013.01); *G06F 11/076* (2013.01); *G06F 11/0736* (2013.01); *G06F 11/30* (2013.01)

(58) Field of Classification Search
CPC ............... B61K 9/06; B61L 3/00; B61L 3/02; B61L 23/00; B61L 23/041; B61L 23/047; B61L 1/20; B61L 27/0094; G06F 11/30; G06F 11/076; G06F 11/0736
USPC .................................. 246/249, 169 R; 701/30
See application file for complete search history.

(56) References Cited

U.S. PATENT DOCUMENTS

| 2,662,973 | A | | 12/1953 | McGowan et al. | |
|---|---|---|---|---|---|
| 2,691,722 | A | | 10/1954 | Lewis | |
| 2,963,575 | A | * | 12/1960 | Pelino et al. | 246/169 D |
| 2,993,988 | A | | 7/1961 | Post et al. | |
| 3,546,448 | A | * | 12/1970 | Pelino | 246/246 |
| 3,558,875 | A | | 1/1971 | Gieskieng | |

(Continued)

FOREIGN PATENT DOCUMENTS

| CN | 201296264 | 8/2009 |
|---|---|---|
| DE | 4325018 | 3/1994 |

(Continued)

OTHER PUBLICATIONS

U.S. Appl. No. 13/658,998 of Mark Joseph Bartonek et al., entitled "Flat Wheel Detector With Multiple Sensors", filed Oct. 24, 2012.

(Continued)

*Primary Examiner* — John Q Nguyen
*Assistant Examiner* — Aaron Smith
(74) *Attorney, Agent, or Firm* — Finnegan, Henderson, Farabow, Garrett & Dunner, LLP (57) ABSTRACT

The present disclosure is directed to a dragger. The dragger may have a plurality of sensors configured to be located adjacent a railroad track. Each of the plurality of sensors may be oriented at an angle relative to a horizontal plane. The dragger may also have a controller in communication with the plurality of sensors. The controller may be configured to receive signals from the plurality of sensors, determine a parameter based on at least one of the received signals, and detect a fault condition when the parameter exceeds a threshold.

20 Claims, 6 Drawing Sheets

(56) References Cited

U.S. PATENT DOCUMENTS

| | | | |
|---|---|---|---|
| 3,558,876 A | 1/1971 | Tillman et al. | |
| 4,129,276 A | 12/1978 | Svet | |
| 4,379,330 A * | 4/1983 | Sanville | 246/249 |
| 4,696,446 A | 9/1987 | Mochizuki et al. | |
| 4,702,104 A | 10/1987 | Hallberg | |
| 4,895,324 A * | 1/1990 | Buckles | 246/170 |
| 5,150,618 A | 9/1992 | Bambara | |
| 5,433,111 A | 7/1995 | Hershey et al. | |
| 5,462,244 A | 10/1995 | Van Der Hoek et al. | |
| 5,743,495 A * | 4/1998 | Welles et al. | 246/121 |
| 5,793,492 A | 8/1998 | Vanaki | |
| 6,412,332 B1 * | 7/2002 | Bartonek | 73/12.01 |
| 6,768,551 B2 | 7/2004 | Mian et al. | |
| 6,909,514 B2 | 6/2005 | Nayebi | |
| 6,951,132 B2 | 10/2005 | Davenport et al. | |
| 7,292,144 B2 | 11/2007 | Ballinger | |
| 7,861,979 B2 * | 1/2011 | Beaman | 246/169 R |
| 7,937,192 B2 | 5/2011 | Lueger et al. | |
| 8,006,559 B2 | 8/2011 | Mian et al. | |
| 8,430,363 B2 | 4/2013 | Hesser et al. | |
| 2003/0072001 A1 | 4/2003 | Mian et al. | |
| 2006/0076461 A1 | 4/2006 | DeRose et al. | |
| 2011/0118899 A1 | 5/2011 | Brooks et al. | |
| 2011/0118914 A1 | 5/2011 | Brooks et al. | |

FOREIGN PATENT DOCUMENTS

| | | | |
|---|---|---|---|
| JP | 2008-58256 | | 3/2008 |
| JP | 2008240473 A | * | 10/2008 |
| WO | WO 2007/009132 | | 1/2007 |
| WO | WO 2010/000850 | | 1/2010 |

OTHER PUBLICATIONS

U.S. Appl. No. 13/659,169 of Mark Joseph Bartonek, entitled Speed Sensitive Dragging Equipment Detector, filed Oct. 24, 2012.

U.S. Appl. No. 13/659,199 of Mark Joseph Bartonek, entitled "System and Method for Characterizing Dragging Equipment", filed Oct. 24, 2012.

* cited by examiner

FIG. 6

MULTI-FUNCTION DRAGGER

TECHNICAL FIELD

The present disclosure relates generally to a dragger and, more particularly, to a multi-function dragger capable of detecting multiple fault conditions on a railroad track.

BACKGROUND

Draggers or dragging equipment detectors are used in the railroad industry to detect the presence of objects loosely hanging below a railroad car. Low hanging objects can impact and severely damage switches, tracks, ties, and other equipment placed adjacent and/or between the rails. Low hanging objects also have the potential to derail railroad cars.

One type of detector, known as a static dragging equipment detector, has a plurality of fixed position paddles. Each paddle has one or more force sensors, for example acceleration sensors, to sense a force impact against the paddle. One shortcoming of such detectors is that not much can be ascertained from a force impact except that something hanging low on the train hit one or more paddles.

An exemplary dragging equipment detector is disclosed in U.S. Pat. No. 6,412,332 to Bartonek that issued on Jul. 2, 2002 ("the '332 patent"). Specifically, the '332 patent discloses a dragger that has four impact elements, two located outside of a track and two located inside the track. The '332 patent discloses that each impact element houses a single axis sensor, which is mounted such that it can detect a horizontal component but not a vertical component of any impact forces imparted by objects dragging beneath the train. The '332 patent further discloses that a detection circuit connected to the sensor determines whether the g-force corresponding to the impact exceeds an alarm threshold. Moreover, the '332 patent notes that exclusion of vertical forces avoids the problem of triggering false alarms by detecting vibrations from flat wheels.

Although the '332 patent discloses a static dragging equipment detector with multiple sensors, the sensors of the '332 patent are configured to detect only horizontal impacts. As such the dragging equipment detector of the '332 patent can detect low hanging equipment on a train but cannot detect other fault conditions such as flat wheels or derailment of the train. Additionally, the alarm threshold has a fixed level in the '332 patent. As a result, when a train is moving at a low speed, the impact of low hanging objects on the impact elements may not be detected by the dragging equipment detector of the '332 patent. At high train speeds, the dragging equipment detector of the '332 patent may trigger a false alarm resulting from the impact of spurious objects, for example, icicles, which do not pose a danger to the train or the railroad track.

The dragger of the present disclosure solves one or more of the problems set forth above and/or other problems in the art.

SUMMARY

In one aspect, the present disclosure is directed to a dragger. The dragger may include a plurality of sensors configured to be located adjacent a railroad track. Each of the plurality of sensors may be oriented at an angle relative to a horizontal plane. The dragger may also include a controller in communication with the plurality of sensors. The controller may be configured to receive signals from the plurality of sensors. The controller may also be configured to determine a parameter based on at least one of the received signals. In addition, the controller may be configured to detect a fault condition when the parameter exceeds a threshold.

In another aspect, the present disclosure is directed to a method of detecting a fault condition on a railroad track. The method may include generating a plurality of signals corresponding to impact forces acting in a plurality of directions. The method may further include determining a parameter based on a signals selected from the plurality of signals. In addition, the method may include triggering an alarm indicating a specific fault condition based on the selected signals, when the parameter exceeds a threshold.

DETAILED DESCRIPTION

Figure 1:
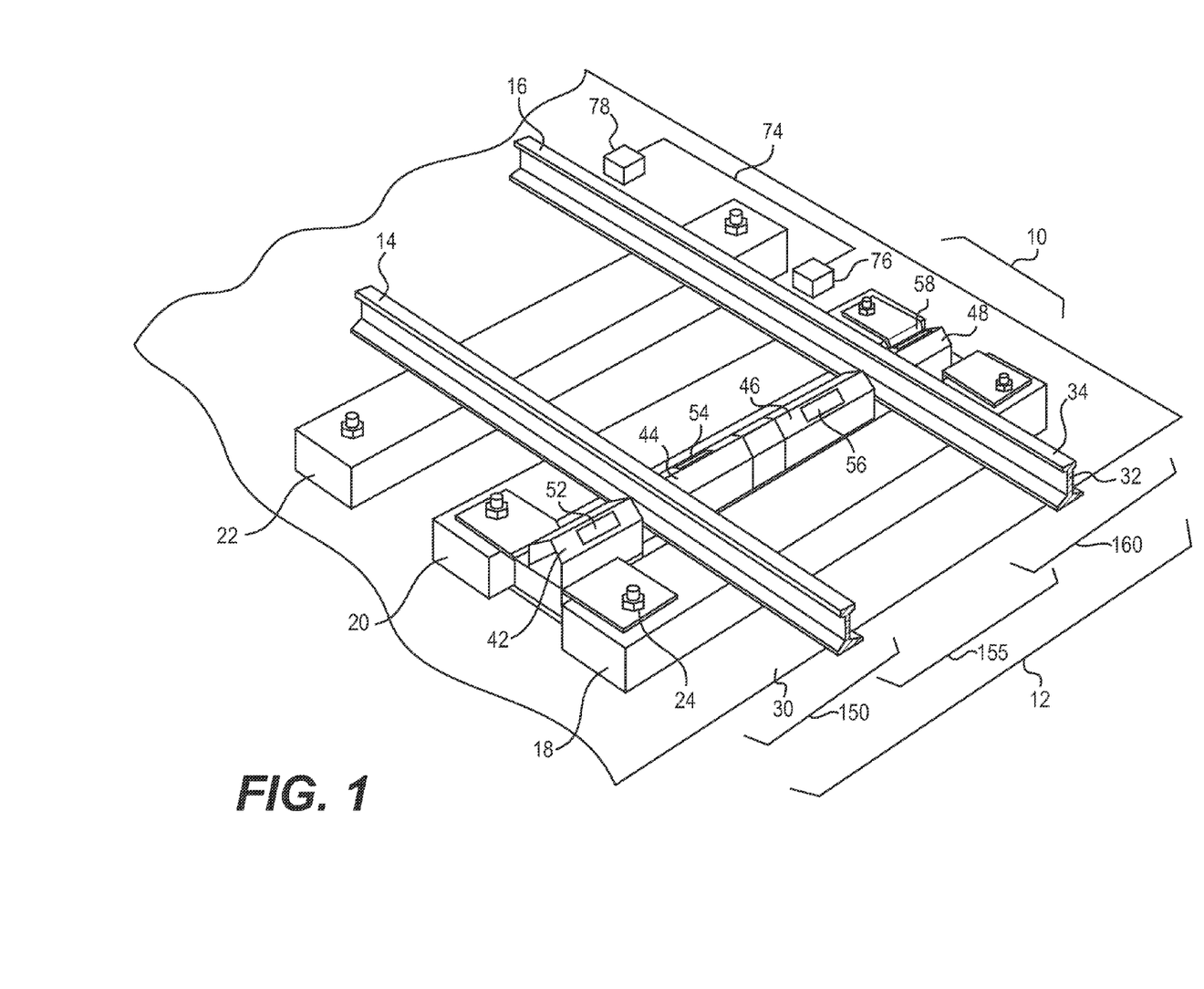
FIG. 1 is a pictorial illustration of an exemplary disclosed dragger.

FIG. 1 illustrates an exemplary embodiment of a dragger 10 installed along a railroad track 12, which may include a first rail 14 and a second rail 16 spaced apart from each other. First and second rails 14, 16 may be attached to ties 18, 20, 22 via fasteners 24. Ties 18, 20, 22 may rest on a substantially horizontal plane 30 and may be spaced apart from each other along a length of railroad track 12 at uniform or non-uniform intervals. Ties 18, 20, 22 may be made of wood, metal, concrete, or any other appropriate material known in the art. First and second rails 14, 16 may have substantially I-shaped cross-sections with a larger width in contact with ties 18, 20, 22 and a relatively smaller width defining an upper surface 34, which may be substantially flat.

Dragger 10 may be attached to first and second rails 14, 16 and may embody one or more flat wheel detectors 150, 160 for detecting flat wheels on a train, and a dragging equipment detector 155 for detecting equipment that may be hanging loosely below the train. Dragger 10 may also serve as a derailment detector for detecting whether the train has derailed. Although only a few of the functions of dragger 10 have been listed, dragger 10 may perform a number of other functions known in the art for detecting faults related to a train and railroad track 12.

Dragger 10 may include four paddles 42, 44, 46, 48 configured to be located adjacent first and second rails 14, 16 of railroad track 12. Specifically, dragger 10 may include a first paddle 42 configured to be located adjacent first rail 14. First paddle 42 may be configured to be located outside railroad track 12. Dragger 10 may also include a second paddle 44 configured to be located adjacent first rail 14. Second paddle 44 may be configured to be located between first and second rails 14, 16. Dragger 10 may further include a third paddle 46 configured to be located adjacent second rail 16. Like second paddle 44, third paddle 46 may also be configured to be located between first and second rails 14, 16. In addition, dragger 10 may include a fourth paddle 48 configured to be located adjacent second rail 16. Fourth paddle 48 may be configured to be located outside railroad track 12. Thus, as illustrated in FIG. 1, first and fourth paddles 42, 48 may be configured to be located outside railroad track 12 and second and third paddles 44, 46 may be configured to be located between first and second rails 14, 16 of railroad track 12. One skilled in the art would recognize, however, that dragger 10 may include some or all of the first, second, third, and fourth paddles 42, 44, 46, 48.

As illustrated in FIG. 1, first, second, third, and fourth paddles 42, 44, 46, and 48 may include first, second, third, and fourth sensors 52, 54, 56, and 58, respectively. Thus, first sensor 52 may be configured to be located adjacent first rail 14 outside railroad track 12. Second sensor 54 may be configured to be located adjacent first rail 14 and between first and second rails 14, 16. Third sensor 56 may be configured to be located adjacent second rail 16 and between first and second rails 14, 16. And fourth sensor 58 may be configured to be located adjacent second rail 16 and outside railroad track 12. Although FIG. 1 illustrates first, second, third, and fourth paddles 42, 44, 46, 48 located in a single row between two adjacent ties 18, 20 of railroad track 12, it is contemplated that one or more of first, second, third, and fourth paddles 42, 44, 46, 48 may be located between other pairs of ties, for example, ties 20, 22, etc. In one exemplary embodiment, first paddle 42 may be located between ties 18 and 20 and second paddle 44 may be located between ties 20 and 22 so that second sensor 54 may be spaced apart from first sensor 52 along a length of first rail 14.

Figure 2:
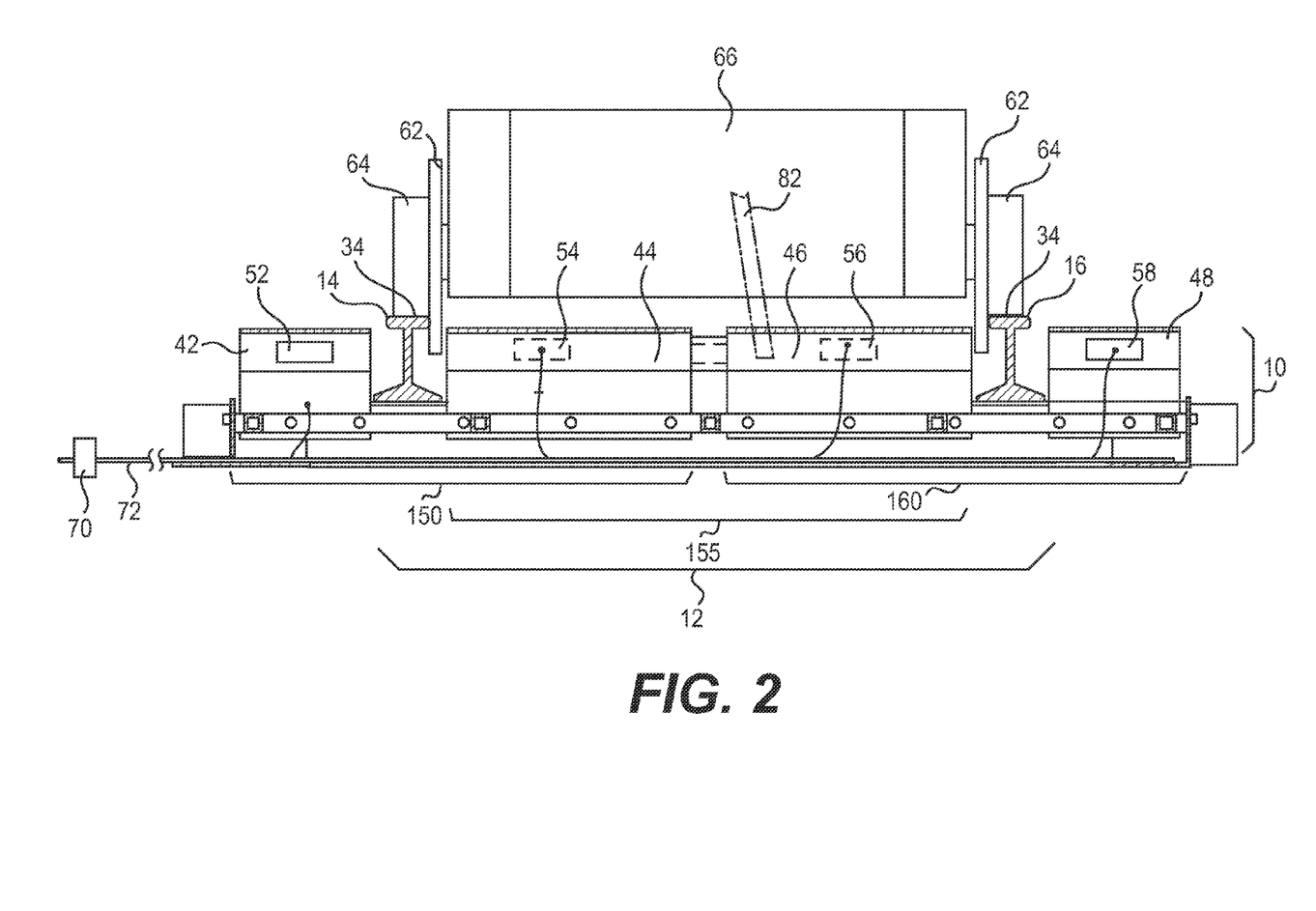
FIG. 2 is an end view of the exemplary disclosed dragger of FIG. 1.

FIG. 2 illustrates an end view of dragger 10 and railroad track 12 looking in a direction parallel to first and second rails 14, 16. As illustrated in FIG. 2, first, second, third, and fourth paddles, 42, 44, 46, 48 may be located so that their uppermost portions lie beneath the upper surfaces 34 of first and second rails 14, 16. In one exemplary embodiment, the uppermost portions of first, second, third, and fourth paddles, 42, 44, 46, 48 may be located about 1 to 2 inches below upper surfaces 34 of first and second rails 14, 16. Further, second and third paddles 44, 46 may be located to ensure that flange portions 62 of wheels 64 of railroad car 66 do not interfere with second and third paddles 44, 46 as railroad car 66 travels on railroad track 12. A controller 70 may be connected to first, second, third, and fourth sensors 52, 54, 56, 58 via a bus 72. Signals from first, second, third, and fourth sensors 52, 54, 56, 58 may be communicated to controller 70 through bus 72. One skilled in the art will recognize, however, that signals from first, second, third, and fourth sensors 52, 54, 56, 58 may be communicated to controller 70 via a wireless connection, cellular connection, an ethernet connection, an optical connection, or other communication means known in the art. A battery (not shown) or any other power source known in the art may be used to supply power to first, second, third, and fourth sensors 52, 54, 56, 58, and controller 70.

When wheels 64 of railroad car 66 develop flat portions, these flat portions may repeatedly impact first and second rails 14, 16 of railroad track 12 as the wheels 64 rotate. Flat wheel detectors 150, 160 of dragger 10 may detect the presence of such flat portions on wheels 64. Railroad car 66 may also have a number of items attached to it. For example, railroad car may have a hose 82 attached to its underside. When hose 82 comes loose from its mounting, it may hang below railroad car 66, and may impact one or both of second and third paddles 44, 46 as railroad car 66 travels past dragger 10. Signals from second and third sensors 54, 56 mounted on second and third paddles 44, 46, respectively, may be used to detect the presence of such loose items. It is also contemplated that if railroad car 66 derails, wheels 64 or other portions of railroad car 66 may contact one or more of first, second, third, and fourth paddles 42, 44, 46, 48, and the signals from first, second, third, and fourth sensors 52, 54, 56, 58 may be used to detect that railroad car 66 has derailed.

Figure 3:
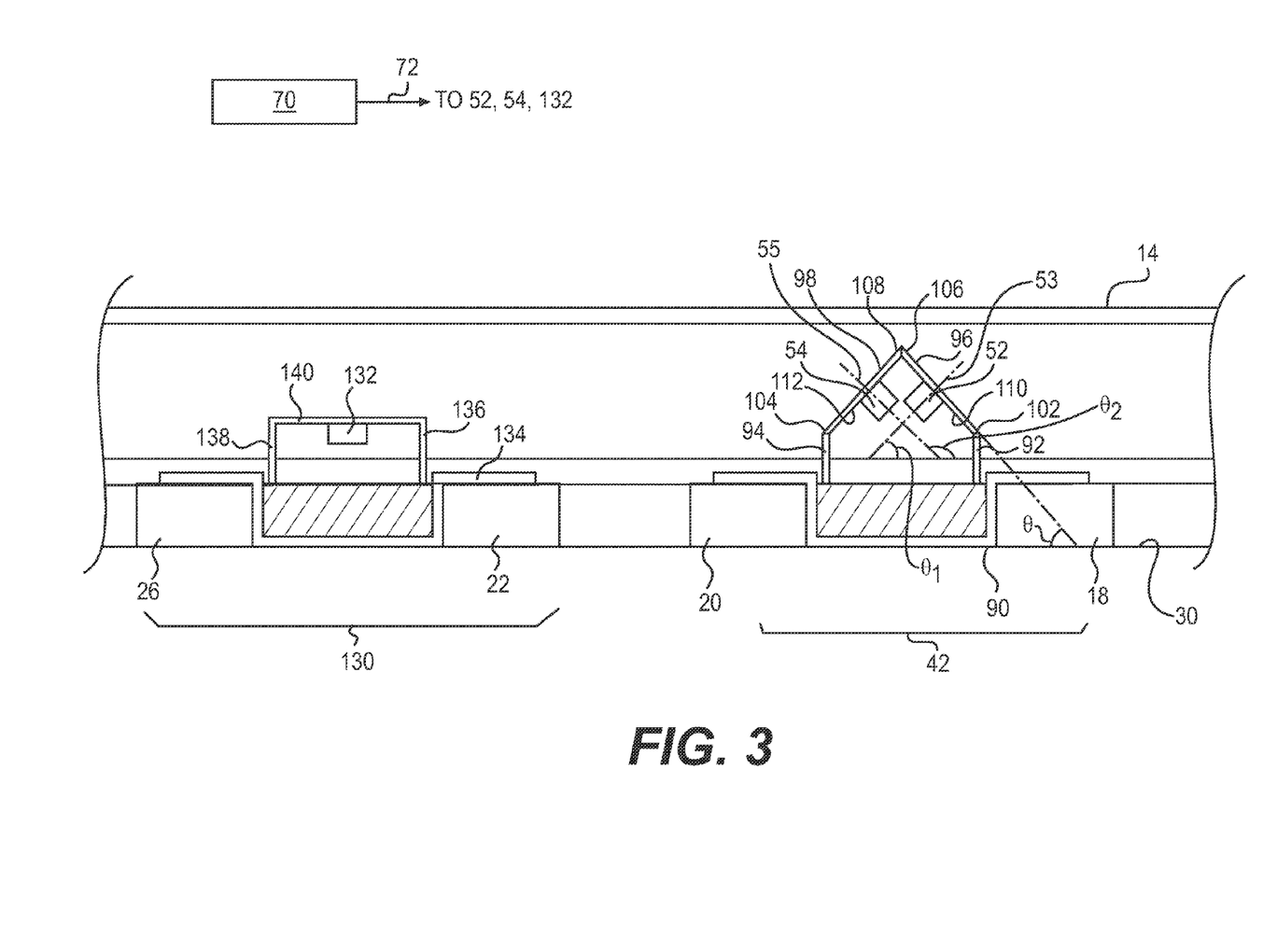
FIG. 3 is a pictorial illustration of an exemplary disclosed paddle in the dragger of FIG. 2.

FIG. 3 illustrates an end view of first paddle 42 looking in a direction orthogonal to first rail 14. As shown in FIG. 3, first paddle 42 may have a base 90 configured to be attached to ties 18, 20. First paddle 42 may include a first generally vertical plate 92 and a second generally vertical plate 94 spaced apart from first vertical plate 92. First and second vertical plates 92, 94, may be attached to base 90 by fasteners, welds, or by any other means of attachment known in the art. First paddle 42 may also include a first inclined plate 96 and a second inclined plate 98. First inclined plate 96 may be attached to first vertical plate 92 at first edge 102. First inclined plate 96 may also have a second edge 104. Second inclined plate 98 may be attached to second vertical plate 94 at third edge 106. Second inclined plate 98 may also have a fourth edge 108. Second edge 104 of first inclined plate 96 may be attached to fourth edge 108 of second inclined plate 98 such that first and second inclined plates 96, 98 form a substantially inverted V-shaped top for first paddle 42. First and second inclined plates 96, 98 may be attached to first and second vertical plates 92, 94, respectively, and to each other via fasteners, welds, or by any other means of attachment known in the art. In one exemplary embodiment, first and second inclined plates 96, 98 may be inclined at angles $\theta$ ranging from about 15° to about 85°, with respect to horizontal plane 30. First and second vertical plates 92, 94 and first and second inclined plates 96, 98 may be made of metal, plastic, or any other material known in the art that may allow them to withstand the impact of loose objects, for example, hose 82, without being damaged. Although first paddle 42 has been discussed as having two vertical plates 92, 94 and two inclined plates 96, 98, it is contemplated that first paddle 42 may only have a first vertical plate 92 attached to base 90 and a first inclined plate 96 attached to first vertical plate 92 at first edge 102 at an angle $\theta$ with respect to horizontal plane 30.

First sensor 52 may be attached to one of first and second inclined plates 96, 98. As shown in FIG. 3, for example, first sensor 52 may be attached to an inner surface 110 of first inclined plate 96 and may be inclined at a first angle $\theta_1$ relative to horizontal plane 30. As used in this disclosure, first angle $\theta_1$ may be measured as an angle made by a longitudinal axis 53 of first sensor 52 with respect to horizontal plane 30. First sensor 52 may generate signals in response to vibrations of first rail 14. The forces generated by impacts of flat portions of wheel 64 may be transferred to first and second rails 14, 16. These forces may also be transferred to dragger 10 because dragger 10 may be coupled to first and second rails 14, 16. First sensor 52 may also generate signals in response to impact of an object with first paddle 42.

Although, FIG. 3 has been discussed with reference to first paddle 42 and first sensor 52, each of second, third, and fourth paddles 44, 46, and 48 may have a structure and arrangement similar to that of first paddle 42. For example, as shown by the dashed line in FIG. 3, second sensor 54 may be attached to an inner surface 112 of second inclined plate 98 in second paddle 44 and may be inclined at a second angle $\theta_2$ relative to horizontal plane 30. As used in this disclosure, second angle $\theta_2$ may be measured as an angle made by a longitudinal axis 55 of second sensor 54 with respect to horizontal plane 30. In one exemplary embodiment, a difference between second angle $\theta_2$ and first angle $\theta_1$ may be about 90° such that second sensor 54 may be located generally orthogonal to first sensor 52. In another exemplary embodiment, first angle $\theta_1$ may be about 45°.

As shown in FIG. 3, dragger 10 may include a fifth paddle 130, which may house a fifth sensor 132. Fifth paddle 130 may have a base 134 configured to be attached to ties 22 and 26. Fifth paddle 130 may also have a third generally vertical plate 136 and a fourth generally vertical plate 138 spaced apart from the third vertical plate 136. In addition, fifth paddle 130 may have a generally horizontal plate 140 attached at its edges to third and fourth vertical plates 136, 138. Fifth sensor 132 may be attached to an inner surface 142 of horizontal plate 140 such that fifth sensor 132 may be oriented generally orthogonal to horizontal plane 30. Fifth sensor 130 may be connected to controller 70 via bus 72 and may generate signals in response to forces generated because of impacts of flat portions of wheel 64 on first rail 14. Because of its orientation, fifth sensor 132 may be more sensitive to the forces generated by the near vertical impacts of flat portions of wheel 64 on first rail 14. Fifth paddle 130 may be mounted on either side of and outside railroad track 12 like first and fourth paddles 42, 48. Alternatively, fifth paddle 130 may be mounted adjacent to first or second rails 14, 16 and in between first and second rails 14, 16 like second and fourth paddles 44, 46. Dragger 10 may include one or more additional paddles similar to fifth paddle 130 mounted adjacent to first and second rails 14, 16. Although fifth sensor 132 has been described as being housed in fifth paddle 130, it is contemplated that fifth sensor 132 may instead be attached to inner surfaces 110 or 112 of first, second, third, or fourth paddles 42, 44, 46, 48 while still being oriented orthogonal to horizontal plane 30. Further, although fifth paddle 130 has been shown in FIG. 3 as being located between ties 22, 26, it is contemplated that fifth paddle 130 may be located between any other sets of ties, for example, 18 and 20, 20 and 22, etc.

Returning to FIG. 1, third and fourth sensors 56, 58 may be attached to third and fourth paddles 46, 48 in a manner similar to first and second sensors 52, 54. For example, third sensor 56 may be attached to an inner surface (not shown) of first inclined plate 96 of third paddle 46 and may be located at a third angle $\theta_3$ with respect to horizontal plane 30. Similarly, fourth sensor 58 may be attached to an inner surface (not shown) of second inclined plate 98 in fourth paddle 48 and may be located at a fourth angle $\theta_4$ with respect to horizontal plane 30. Third and fourth angle $\theta_3$ and $\theta_4$ may be measured with respect to horizontal plane 30 in a manner similar to that for first and second angles $\theta_1$ and $\theta_2$. Attaching sensors alternately to the inside surfaces 110, 112 of first and second inclined plates 96, 98 in first, second, third, and fourth paddles 42, 44, 46, 48, may allow the sensors to detect flat wheels or impacts from low hanging objects beneath railroad car 66 regardless of a direction of travel of railroad car 66.

Although first and third sensors 52, 56 have been described above as being attached to first inclined plate 96, either or both of them may be attached to second inclined plate 98 of first and third paddles 42, 46, respectively. Similarly, although second and fourth sensors 54, 58 have been described as being attached to second inclined plate 98, either or both of them may be attached to first inclined plate 96 of second and fourth paddles 44, 48 respectively. It is further contemplated that first, second, third, and fourth angles $\theta_1$, $\theta_2$, $\theta_3$, $\theta_4$ may be the same or different. It is also contemplated that each of first, second, third, and fourth paddles 42, 44, 46, 48 may have more than one sensor. Thus, for example, first paddle 42 may have a first sensor 52 attached to first inclined plate 96 and a second sensor 54 attached to second inclined plate 98. Second, third, and fourth paddles 44, 46, and 48 may have a similar two sensor construction as first paddle 42.

First and second paddles 42 and 44 may form first flat wheel detector 150. Paddles 42 and 44 may cooperate to help detect the presence of a flat wheel 64 on first rail 14. Third and fourth paddles 46 and 48 may form second flat wheel detector 160. Paddles 46 and 48 may cooperate to help detect the presence of a flat wheel 64 on second rail 16. In yet another exemplary embodiment, first flat wheel detector 150 may include fifth paddle 130 in addition to first and second paddles 42, 44 and signals from first, second, and fifth sensors, 52, 54, 132 may be used by controller 70 to detect a flat wheel on first rail 14. It is also contemplated that a sixth paddle having s sixth sensor oriented orthogonal to horizontal plane 30, similar to fifth paddle 130, may be included in second flat wheel detector 160.

Figure 4:
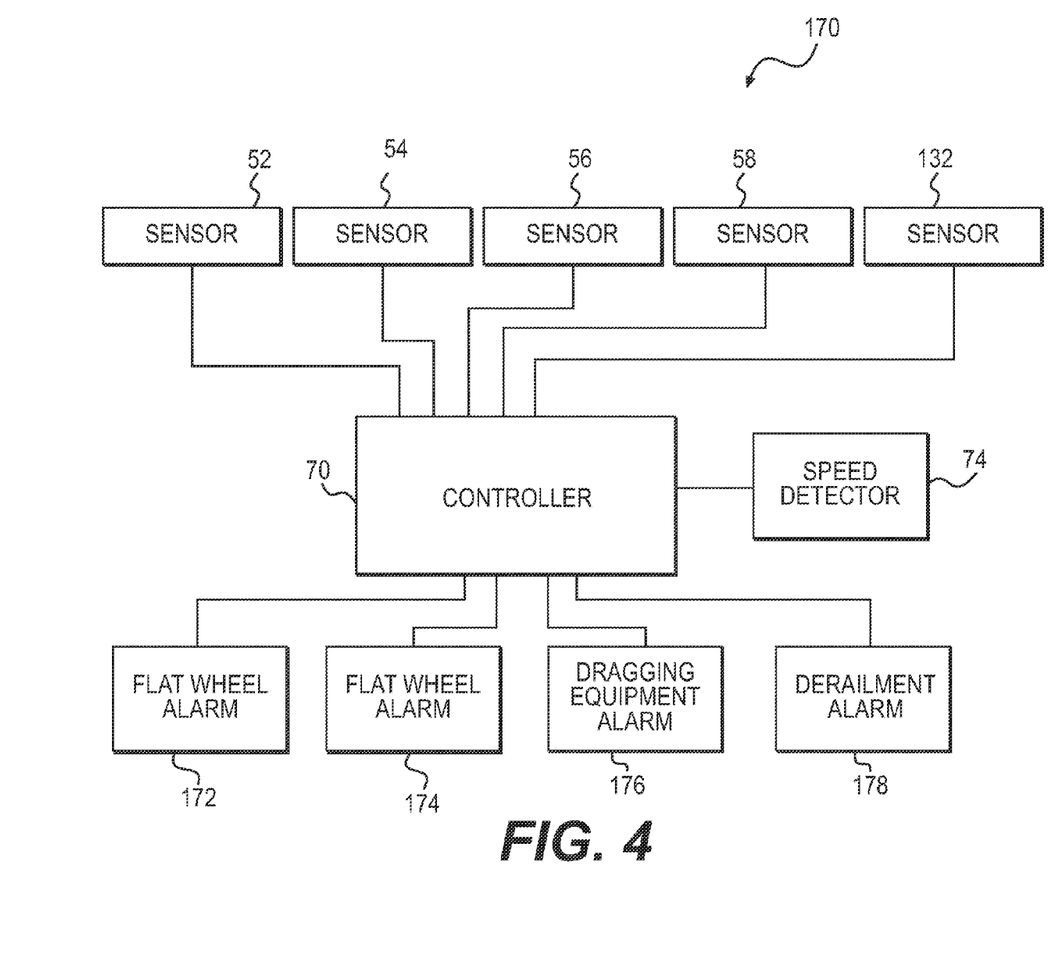
FIG. 4 is a schematic of an exemplary disclosed fault detection system that may be used in conjunction with the dragger of FIG. 1.

FIG. 4 illustrates a schematic diagram of a fault detection system 170 that may be used in conjunction with dragger 10 shown in FIG. 1. Fault detection system 170 may include components that cooperate to detect a variety of fault conditions related to railroad car 66. As shown in FIG. 4, fault detection system 170 may include controller 70, first, second, third, fourth, and fifth sensors 52, 54, 56, 58, 132, a speed detector 74, a first flat wheel alarm 172, a second flat wheel alarm 174, a dragging equipment alarm 176, and a derailment alarm 178. Signals generated by first, second, third, fourth, and fifth sensors 52, 54, 56, 58, 132, and speed detector 74 may be directed to controller 70 for further processing. Controller 70 may be configured to trigger one or more of first flat wheel alarm 172, second flat wheel alarm 174, dragging equipment alarm 176, and derailment alarm 178. Although four separate alarms 172, 174, 176, and 178 have been described above, it is contemplated that fault detection system 170 may include only one alarm 172 which may indicate the specific fault condition when triggered by controller 70. For example, when triggered, alarm 172 may indicate whether a fault condition has been triggered because of flat wheels, loose equipment hanging below railroad car 66, or derailment of railroad car 66.

Controller 70 may embody a single microprocessor or multiple microprocessors, field programmable gate arrays (FPGAs), digital signal processors (DSPs), etc. that include a means for controlling an operation of fault detection system 170 in response to signals received from the various sensors. Numerous commercially available microprocessors can be configured to perform the functions of controller 70. Various other known circuits may be associated with controller 70, including power supply circuitry, signal-conditioning circuitry, actuator driver circuitry (i.e., circuitry powering solenoids, motors, or piezo actuators), communication circuitry, and other appropriate circuitry.

First, second, third, fourth, and fifth sensors 52, 54, 56, 58, and 132 may be any force sensors commonly known in the art, such as, for example, a load link, a strain gauge, a transducer, or a load cell, single axis or tri axis accelerometer. Speed detector 74 may be configured to generate a signal indicative of a speed of a rotating component of railroad car 66 (e.g., wheels 64) that could subsequently be used to determine the travel speed of railroad car 66, or alternatively be configured to directly detect the travel speed (e.g., speed detector 74 may be a Doppler, radar, or laser type sensor). In another embodiment, speed detector 74 may include a pair of wheel gate transducers 76, 78 (see FIG. 1) to determine the time required for passage of wheels 64 through the wheel gate between wheel gate transducers 76, 78. In another embodiment, speed detector 74 may be omitted, and controller 70 may be configured to determine a change in position of railroad car 66 (e.g., via a positioning system) relative to a change in time, and then calculate the travel speed of railroad car 66 based on the changes in position and time.

Alarms 172, 174, 176, 178 may be located within a control cabin (not shown) of a train including railroad car 66. Alternatively or additionally, alarms 172, 174, 176, 178 may be located at a central location for monitoring the status of more than one train and railroad track 12, for example, in a central control room or maintenance department. Alarms 172, 174, 176, 178 may be audible, visual, or both.

Figure 5:
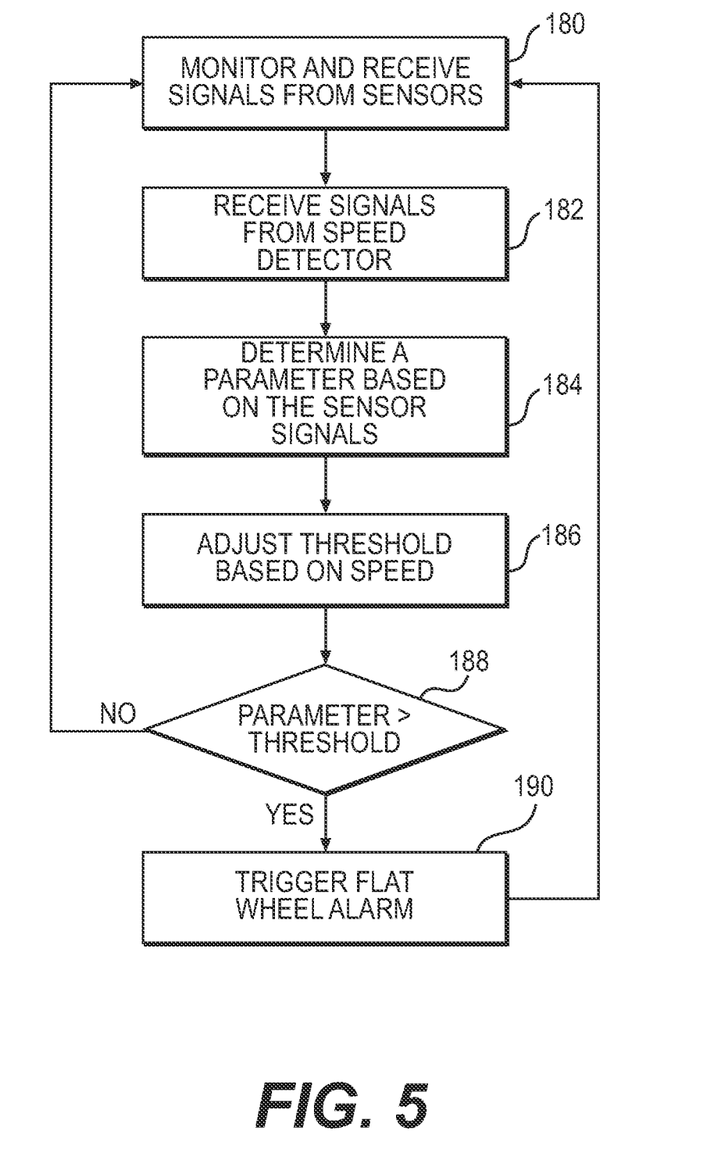
FIG. 5 is a flow chart illustrating an exemplary disclosed method associated with operation of the dragger of FIG. 1.
Figure 6:
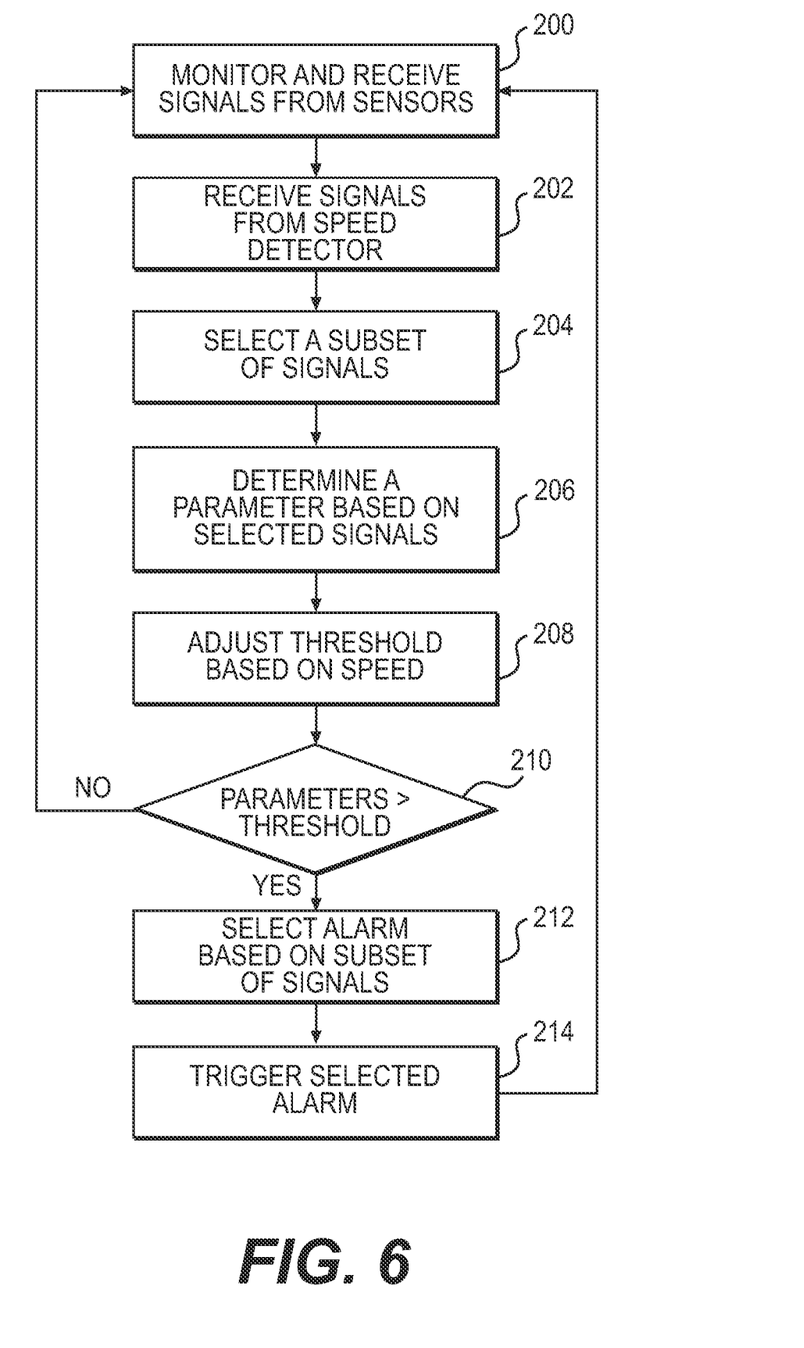
FIG. 6 is a flow chart illustrating an exemplary disclosed method performed by the dragger of FIG. 1.

FIGS. 5 and 6 illustrate exemplary operations performed by controller 70 during operation of fault detection system 170. FIGS. 5 and 6 will be discussed in more detail in the following section to further illustrate the disclosed concepts.

Industrial Applicability

The disclosed dragger and fault detection system may be used to detect many different fault conditions related to a railroad car travelling on a railroad track. For example, the dragger and the fault detection system may be used to detect flat wheels on a railroad car. The dragger may also be used to detect the presence of objects dragging below a railroad car. In addition, the dragger may be used to determine if the railroad car has derailed. Operation of dragger 10 for detecting flat wheels will be discussed next.

During operation of dragger 10, signals from first, second, third, and fourth sensors 52, 54, 56, and 56 may be transmitted to controller 70. Controller 70 may use signals from first and second sensors 52 and 54, located adjacent first rail 14, to determine whether a wheel 64 travelling on first rail 14 has a flattened portion. Similarly controller 70 may use signals from third and fourth sensors 56 and 58, located adjacent second rail 16, to determine whether a wheel 64 travelling on second rail 16 has a flattened portion.

FIG. 5 illustrates an exemplary disclosed method of detecting flat wheels using first flat wheel detector 150. As illustrated in FIG. 5, controller 70 may monitor and receive signals from first, second, and fifth sensors 52, 54, and 132 (Step 180). As a flat wheel 64 of railroad car 66 rotates on first rail 14, the flat portion of wheel 64 may repeatedly impact first rail 14. These impact forces may be transmitted to first rail 14 and also to dragger 10 which may be coupled to first rail 14. In particular, because first and second sensors 52, 54 on dragger 10 may be inclined at first and second angles $\theta_1$, $\theta_2$ to horizontal plane 30, first and second sensors 52, 54 may detect the forces generated by the vertical impact of flat wheel 64 against first rail 14 as the flat wheel 64 rotates. Thus, vertical components of signals generated by first and second sensors 52, 54 may be used to detect the presence of a flattened portion on wheel 64. Further, horizontal components of signals generated by first and second sensors 52, 54 may be used to filter out any effects on the sensors caused by sources other than the flattened portions of wheel 64. Signals generated by fifth sensor 132 may be compared to vertical components of signals generated by first and second sensors 52, 54 to further isolate the effect of vertical impacts cause by flattened portions of wheel 64 on first rail 14.

In one exemplary embodiment first and second sensors 52, 54 may be configured to be spaced apart from each other by a predetermined distance along a length of railroad track 12. Separating first and second sensors 52, 54 in this manner may allow first flat wheel detector 150 to detect the presence of more than one flat portion on a wheel. For example, consider a wheel 64 having two flat portions angularly spaced on the circumference of wheel 64. When the first flat portion impacts first rail 14 near first sensor 52, first sensor 52 may generate a strong signal in response to the impact. Second sensor 54, which may be spaced apart from first sensor 52 may, however, generate a relatively weaker signal in response to the impact of the first flat portion. As the wheel rotates and travels from near first sensor 52 towards second sensor 54, the second flat portion may impact first rail 14. The strength of the signal generated by first and second sensors 52, 54 may depend on the relative distance of wheel 64 from first and second sensors 52, 54. Differences in the signals generated by the first and second sensors 52, 54 may, thus, be used to detect the presence of more than one flat portion on wheel 64.

Controller 70 may receive signals from speed detector 74 that indicate a speed of railroad car 66 travelling on railroad track 12 (Step 182). Controller 70 may determine a parameter based on at least one of the signals received from first, second, and fifth sensors 52, 54, 132 (Step 184). For example, controller 70 may determine a parameter for each of the signals received from the first, second, and fifth sensors 52, 54, 132. Alternatively, controller 70 may determine the parameter as a maximum from among the parameters for the signals received from the first, second, and fifth sensors 52, 54, 132. As another alternative, controller 70 may determine vertical components of the signals received from first and second sensors 52, 54 before determining the parameter. As yet another alternative, controller 70 may superimpose, combine, or merge scaled or un-scaled signals from the first, second, and fifth sensors 52, 54, and 132 before generating a parameter from the combined signal. Controller 70 may use the signals generated by first, second, and fifth sensors 52, 54, and 132 directly to generate the parameter. For example, controller may process these signals in a time domain. Alternatively, controller 70 may transform the signals generated by first, second, and fifth sensors 52, 54, and 132 into a frequency domain before processing them to generate a parameter. Controller 70 may also perform other manipulations of the signals generated by first, second, and fifth sensors 52, 54, and 132, for example, by performing fast fourier transforms or any other appropriate signal processing techniques known in the art. In one exemplary embodiment controller 70 may select an amplitude of the signals received from the first, second, and fifth sensors 52, 54, 132 as the parameter. One skilled in the art would recognize, however, that the parameter may be a measure of energy, a power spectral density, or any other appropriate parameter known in the art that represents the intensity of the impact of a flattened portion of wheel 64 on first rail 14.

Controller 70 may adjust a threshold based on the speed of railroad car 66 (Step 186). For example, at slow speeds, the impacts of a flat portion of wheel 64 may create forces of relatively lower magnitude. In contrast, at higher speeds, the forces generated may be of a relatively higher magnitude because of the more frequent impact of the flat portions on first rail 14 at higher speeds of railroad car 66. At relatively lower speeds of railroad car 66, a parameter determined from the signals received from first, second, and fifth sensors 52, 54, 132 may have a small magnitude. If the threshold is set too high, the parameter may, therefore, not exceed the threshold and flat wheel detector 150 may not be able to detect a flat wheel when railroad car 66 is travelling at a low speed. In contrast, if the threshold is set too low, slight vibrations in first rail 14 may cause controller 70 to trigger first flat wheel alarm 172. Thus, a lower threshold may be necessary when a speed of the railroad car 66 is low and a higher threshold may be necessary when the speed of the railroad car 66 is high. Controller 70 may adjust the threshold to have a lower value at low speeds and higher value at high speeds based on a speed of railroad car 66.

Controller 70 may compare the parameter with the threshold to determine if the parameter exceeds the threshold (Step 188). Controller 70 may also determine a width of a flat portion of wheel 64 by determining a duration for which the parameter remains above the threshold. Thus for example, at any given speed, as railroad car 66 passes dragger 10, a parameter corresponding to one or more of the signals received from the first, second, and fifth sensors 52, 54, 132 may be expected to exceed the threshold for a longer duration when the width of a flat portion on wheel 64 is larger.

When controller 70 determines that the parameter exceeds the threshold (Step 188: YES), controller 70 may trigger first flat wheel alarm 172 (Step 190). After triggering first flat wheel alarm 172, controller 70 may return to Step 180 and continue to monitor and receive signals from first, second, and fifth sensors 52, 54, and 132 (Step 180). When controller 70 determines that the parameter does not exceed the threshold (step 188: NO), controller 70 may also return to step 180 to monitor and receive new signals from first, second, and fifth sensors 52, 54, 132. Although the above discussion focuses on operation of first flat wheel detector 150, second flat wheel detector 160 may operate in a similar manner.

Operation of dragger 10 for detecting a variety of fault conditions based on signals received from specific sensors will be discussed next. As illustrated in FIG. 6, controller 70 may monitor and receive signals from first, second, third, and fourth sensors 52, 54, 56, and 58 (Step 200). These signals may be generated by the first, second, third, and fourth sensors 52, 54, 56, and 58 in response to different stimuli. For example, as railroad car 66 travels on railroad track 12, loose equipment, for example, hose 82 may impact second or third paddles 44, 46. Second and third sensors 54 and 56 may generate signals in response to an impact of any loose object, like hose 82, on second or third paddles 44, 46. Further, when railroad car 66 derails, one or more portions of railroad car 66 may be expected to impact not only second and third paddles 44, 46 but also first and fourth paddles 42 and 48. First and third sensors 52, 56 or second and fourth sensors 54, 58 may generate signals in response to an impact caused by derailment of railroad car 66. Because first, second, third, and fourth sensors 52, 54, 56, and 58 are inclined at first, second, third, and fourth angles, respectively, the signals generated by the first, second, third, and fourth sensors 52, 54, 56, and 58 may correspond to the first, second, third, and fourth impact forces acting in a first, second, third, and fourth direction, respectively.

Controller 70 may receive signals from speed detector 74 that indicate a speed of railroad car 66 travelling on railroad track 12 (Step 202). Controller 70 may select signals from the signals received from first, second, third, and fourth 52, 54, 56, 58 (Step 204). Controller 70 may determine a parameter based on the selected signals (Step 206). Controller 70 may determine the parameter using techniques similar to those discussed above for first flat wheel detector 150. Further, because loose objects are likely to produce horizontal impacts on second and third paddles 44, 46, controller 70 may determine horizontal components of the signals received from second and third sensors 54, 56. Controller 70 may use the horizontal components of the signals received from first and second sensors 52, 54 in generating the parameter.

Controller 70 may adjust the threshold based on a speed of railroad car 66 (Step 208). For example, when railroad car 66 is travelling at a slow speed, hose 82 may impact second or third paddles 44, 46 with a smaller amount of force compared to when railroad car 66 may be travelling at a relatively higher speed. At relatively lower speeds of railroad car 66, a parameter determined from the signals received from second and third sensors 54, 56 may be small because the force of the impact on second and third paddles 44, 46 may be small. If the threshold is set too high, the parameter may not exceed the threshold and dragging equipment detector 155 may not be able to detect dragging equipment when railroad car 66 is travelling at a low speed. In contrast, at relatively higher speeds of railroad car 66, a parameter determined from the signals received from second and third sensors 54, 56 may be large simply because of the vibrations induced in the sensors due to a fast moving railroad car 66. If the threshold is set too low, the parameter may exceed the threshold even without a loose object impacting second and third paddles 44, 46 causing dragging equipment detector 155 to trigger a false alarm. Thus, to detect impact of loose objects with second and third paddles 44, 46 at lower speeds, the threshold may be lowered. In contrast, a much higher threshold may be necessary to detect true impacts of objects with second and third paddles 44, 46 at higher speeds. Controller 70 may, therefore, increase the threshold when the speed of railroad car 66 is high and decrease the threshold when the speed of railroad car 66 is low.

Controller may compare the parameter to the threshold (Step 210). When the parameter exceeds the threshold (Step 210: YES), controller may select an alarm based on the signals selected in step 204 (Step 212). To simplify explanation of the disclosed method, signals from first, second, third, and fourth sensors 52, 54, 56, and 58 will be referred to as 1, 2, 3, and 4, respectively in the following discussion. Controller 70 may select the first flat wheel alarm 172 when the selected signals consist of signals 1 and 2 (Step 212). Controller 70 may select the second flat wheel alarm 174 when the selected signals consist of signals 3 and 4 (Step 212). Controller 70 may select the dragging equipment alarm 176 when the selected signals consist of signals 2 and 3 (Step 212). Controller 70 may select the derailment alarm 178 when the selected signals consist of signals 1 and 3 or signals 2 and 4 (Step 212). Controller 70 may trigger the selected alarm (Step 214). Although separate alarms 172, 174, 176, and 178 have been discussed above, controller 70 may instead select a single alarm 172 and direct alarm 172 to indicate or display the type of fault based on the selected signals. For example, alarm 172 may indicate a flat wheel fault if signals 1, 2 or 3, 4 have been selected. Similarly, alarm 172 may indicate a dragging equipment fault if signals 2, 3 have been selected. And, alarm 172 may indicate a derailment fault if signals 1, 3 or 2, 4 have been selected.

After triggering the selected alarm, controller 70 may return to step 200 to continue to monitor and receive signals from first, second, third, and fourth sensors 52, 54, 56, and 58. When the parameter does not exceed the threshold (Step 210: NO), controller may also return to step 200 to continue to monitor and receive signals from first, second, third, and fourth sensors 52, 54, 56, and 58. Although certain specific combinations of sensors have been described here for detection of various fault conditions, one skilled in the art would recognize that the fault detection system 170 of the present disclosure is not so limited and that other combinations of sensors may be used to detect the above described fault conditions or other fault conditions.

It will be apparent to those skilled in the art that various modifications and variations can be made to the disclosed dragger without departing from the scope of the disclosure. Other embodiments of the dragger will be apparent to those skilled in the art from consideration of the specification and practice of the dragger disclosed herein. It is intended that the specification and examples be considered as exemplary only, with a true scope of the disclosure being indicated by the following claims and their equivalents.

What is claimed is:

1. A dragger, comprising:
a plurality of sensors configured to be located adjacent a railroad track, each of the plurality of sensors being oriented at an angle relative to a horizontal plane; and
a controller in communication with the plurality of sensors, the controller being configured to:
receive a first set of signals from the plurality of sensors;
select a plurality of signals from the first set of signals based on a predetermined fault condition to form a second set of signals, the second set of signals corresponding to a combination of sensors from the plurality of sensors;
determine a parameter based on characteristics of a combined signal obtained from the second set of signals;
detect a fault condition when the parameter exceeds a threshold;
identify a type of the fault condition based on the combination of the sensors corresponding to the second set of signals; and trigger an alarm corresponding to the identified fault condition.

2. The dragger of claim 1, wherein the plurality of sensors includes:
a first sensor configured to be located adjacent a first rail of the railroad track, the first sensor being oriented at a first angle relative to the horizontal plane;
a second sensor configured to be located adjacent the first rail and oriented at a second angle relative to the horizontal plane;
a third sensor configured to be located adjacent a second rail of the railroad track and oriented at a third angle relative to the horizontal plane; and
a fourth sensor configured to be located adjacent the second rail and oriented at a fourth angle relative to the horizontal plane.

3. The dragger of claim 2, wherein:
the first and fourth sensors are configured to be located outside the railroad track; and
the second and third sensors are configured to be located between the first and second rails.

4. The dragger of claim 3, wherein each of the first, second, third, and fourth sensors is configured to generate a signal representing a force of impacts on the dragger.

5. The dragger of claim 4, wherein each of the first, second, third, and fourth sensors is mounted on a separate paddle including:
a first generally vertical plate;
a second generally vertical plate parallel to and spaced apart from the first vertical plate;
a first inclined plate connected at a first edge to the first vertical plate; and
a second inclined plate connected at a third edge to the second vertical plate and connected at a fourth edge to a second edge of the first inclined plate, such that the first inclined plate and the second inclined plate form a substantially inverted V-shaped top, wherein one of the first, second, third, and fourth sensors is attached to one of the first and the second inclined plates.

6. The dragger of claim 5, wherein the first sensor is attached to the first inclined plate of a first paddle.

7. The dragger of claim 6, wherein the second sensor is attached to the second inclined plate of a second paddle.

8. The dragger of claim 7, wherein the third sensor is attached to the first inclined plate of a third paddle.

9. The dragger of claim 8, wherein the fourth sensor is attached to the second inclined plate of a fourth paddle.

10. The dragger of claim 9, further including a speed detector configured to generate a signal indicative of a speed of a railroad car travelling past the dragger, wherein the controller is further configured to adjust the threshold based on the speed.

11. The dragger of claim 10, wherein:
the first angle is about equal to the third angle; and
the second angle is about equal to the fourth angle.

12. The dragger of claim 11, wherein the parameter is an amplitude.

13. The dragger of claim 12, wherein the type of fault condition is a dragging equipment fault condition, when the parameter is based on signals from the second and third sensors.

14. The dragger of claim 12, wherein the type of fault condition is a derailment fault condition, when the parameter is based on signals from the first and third sensors.

15. The dragger of claim 12, wherein the type of fault condition is a flat wheel fault condition, when the parameter is based on the signals generated by the first and second sensors, or by the third and fourth sensors.

16. A method of detecting a fault condition on a railroad track, comprising:
generating a first set of signals corresponding to impact forces acting in a plurality of directions using a plurality of sensors;
selecting, using a processor, a plurality of signals from the first set of signals based on a predetermined fault condition to form a second set of signals, the second set of signals corresponding to a combination of sensors from the plurality of sensor;
determining, using the processor, a parameter based on characteristics of a combined signal obtained from the second set of signals;
identifying, using the processor, a type of fault condition based on the combination of the sensors corresponding to the second set of signals, when the parameter exceeds a threshold; and triggering, using the processor, an alarm corresponding to the identified fault condition.

17. The method of claim 16, wherein generating the first set of signals includes:
generating a first signal corresponding to a first impact force acting in a first direction;
generating a second signal corresponding to a second impact force acting in a second direction;
generating a third signal corresponding to a third impact force acting in a third direction; and
generating a fourth signal corresponding to a fourth impact force acting in a fourth direction.

18. The method of claim 17, wherein the second set of signals includes the second signal and the third signal, and an alarm indicates a dragging equipment fault condition.

19. The method of claim 17, wherein the second set of signals include the first signal and the second signal, or the third signal and the fourth signal, and the alarm indicates a flat wheel fault condition.

20. A dragging equipment detector system, comprising:
a first sensor configured to be located adjacent a first rail of a railroad track, located outside the railroad track, and oriented at a first angle relative to a horizontal plane;
a second sensor configured to be located adjacent the first rail, between the first rail and a second rail of the railroad track, and oriented at a second angle relative to the horizontal plane;
a third sensor configured to be located adjacent the second rail, between the first rail and the second rail, and oriented at a third angle relative to the horizontal plane;

a fourth sensor configured to be located adjacent the second rail, located outside the railroad track, and oriented at a fourth angle relative to the horizontal plane;

an alarm configured to indicate a fault condition; and a controller configured to:
- receive a first set of signals from the first, second, third, and fourth sensors, and the speed detector;
- select a plurality of signals from the first set of signals based on a predetermined fault condition to form a second set of signals, the second set of signals corresponding to a combination of sensors from the first, second, third, and fourth sensors;
- determine a parameter based on characteristics of a combined signal obtained from the second set of signals;
- detect a fault condition when the parameter exceeds a threshold;
- identify a type of the fault condition based on the combination of the sensors corresponding to the second set of signals; and trigger an alarm corresponding to the identified fault condition.

* * * * *